US006822229B2

(12) United States Patent
Wilken et al.

(10) Patent No.: US 6,822,229 B2
(45) Date of Patent: Nov. 23, 2004

(54) GLOW DISCHARGE SOURCE FOR ELEMENTARY ANALYSIS

(75) Inventors: Ludger Wilken, Dresden (DE); Volker Hoffmann, Dresden (DE); Peter Geisler, Dresden (DE); Klaus Wetzig, Gaertnereistr. 11, 01259 Dresden (DE)

(73) Assignees: Institut fuer Festkoerper-und Werkstoffschung Dresden E.V., Dresden (DE); Klaus Wetzig, Dresden (DE)

( * ) Notice: Subject to any disclaimer, the term of this patent is extended or adjusted under 35 U.S.C. 154(b) by 0 days.

(21) Appl. No.: 10/221,915

(22) PCT Filed: Apr. 12, 2001

(86) PCT No.: PCT/DE01/01481

§ 371 (c)(1), (2), (4) Date: Dec. 30, 2002

(87) PCT Pub. No.: WO01/80282

PCT Pub. Date: Oct. 25, 2001

(65) Prior Publication Data

US 2003/0116706 A1 Jun. 26, 2003

(30) Foreign Application Priority Data

Apr. 15, 2000 (DE) ........................................ 100 19 257

(51) Int. Cl.[7] .......................... H01J 49/10; G01N 21/66

(52) U.S. Cl. ................... 250/288; 356/311; 315/111.21

(58) Field of Search .......................... 250/288; 356/311; 315/111.21

(56) References Cited

U.S. PATENT DOCUMENTS 5,519,215 A * 5/1996 Anderson et al. ........... 250/288
5,646,726 A * 7/1997 Mitchell et al. ............ 356/311
5,751,262 A * 5/1998 Browning et al. ......... 345/75.2
6,388,381 B2 * 5/2002 Anders .................. 315/111.21
6,643,013 B1 * 11/2003 Shimidzu et al. ........... 356/311
2004/0032211 A1 * 2/2004 Langford et al. ....... 315/111.31

FOREIGN PATENT DOCUMENTS

| | | |
|---|---|---|
| DE | 41 00 980 | 7/1992 |
| EP | 0614210 | 9/1994 |
| EP | 0 636 877 | 2/1995 |

OTHER PUBLICATIONS

V. Hoffman; H.-J. Uhlemann; F. Praessler; K. Wetzig; D. Birus; New Hardware for Radio Frequency Powered Glow Discharge Spectroscopies and its Capabilities for Analytical Applications; Feb. 13, 1996; Fresenius J Anal Chem (1996) 355: 826–830.

* cited by examiner

*Primary Examiner*—John R. Lee
*Assistant Examiner*—Erin-Michael Gill
(74) *Attorney, Agent, or Firm*—Jordan and Hamburg LLP

(57) ABSTRACT

A glow discharge source for the elemental analysis of solid samples of material by means of optical glow discharge spectroscopy (GD-OES) or glow discharge mass spectroscopy (GD-MS) or secondary neutral particle mass spectroscopy (SNMS), a glow discharge being produced by means of a connected electrical voltage source on the sample of material between the latter and an anode and evaluated spectrometrically, wherein a current transformer component for detecting the current flowing between the glow discharge and the voltage source is disposed at or in the anode or connected electrically with the anode.

7 Claims, 3 Drawing Sheets

PRIOR ART

Plasma current

Idle current

Current through water

Current path of electrically conducting sample

Current path of electrically insulated sample $I_{bl}^{ka}$ Idle current from cathode plate $I_{pl}$ Plasma current $I_{bl}^{an}$ Blind current over transformer $I_{wl}^{wa}$ Active current over water U Generator voltage

GLOW DISCHARGE SOURCE FOR ELEMENTARY ANALYSIS

FIELD OF THE INVENTION

The invention relates to a glow discharge source (GD) for the elemental analysis of solid samples by means of optical glow discharge spectroscopy (GD-OES) or glow discharge mass spectroscopy (GD-MS) or secondary neutral particle mass spectroscopy (SNMS). The inventive glow discharge source may be operated with direct current or with pulsed direct current or with HF voltage.

BACKGROUND INFORMATION AND PRIOR ART

In the case of the known glow discharge sources, aglow discharge is produced by means of a connected electrical voltage source on the sample of material between the latter and an anode and this is evaluated spectrometrically (EP 0 636:877; DE 41 00 980; V. Hoffmann; H.-J. Uhlemann; F. Pr äβler; K. Wetzig; Fresenius J. Anal. Chem. (1996) 355: 826–830).

For the glow discharge sources, operated with direct current (DC-GD), the current usually is measured in the voltage source. When glow discharge sources (RF-GD), operated with a high frequency voltage, the power, running to the source or to the adapting network and reflected by the source, and the high-frequency current and the high-frequency voltage are measured.

The known current measurement has the disadvantage that a large idle current $T_{bl}=T_{bl}^{an}+T_{bl}^{ka}$ is superimposed on the plasma current Tpl. Since water-cooling furthermore is integrated in the known glow discharge sources, a portion of the current $T_{wi}^{wa}$ flows to ground because of the finite conductivity of the water. As a result, the current, leaking away over the water cooling, is also disadvantageously detected by the measuring equipment so that the plasma current $T_{pl}$, which alone is relevant for the spectroscopy, is distorted.

SUMMARY OF THE INVENTION

It is therefore an object of the invention to configure a glow discharge source for the elemental analysis of solid samples, for which a glow discharge is produced between the sample of material and an anode by means of a connected electrical voltage source, in such a manner, that the idle current $T_{bl}$ is minimized and the current $T_{wi}^{wa}$, flowing over the cooling water, is not measured.

Pursuant to the invention, this objective is accomplished with the glow discharge source, which is described in the claims.

Pursuant to the invention, a current transformer component for detecting the current flowing between the glow discharge and the current source, is disposed at or in the anode or the components connected electrically with the anode.

Pursuant to appropriate embodiments of the invention, the current transformer component may be a coil or a Hall generator. The current transformer component may also be an ohmic resistance, which is inserted in the connecting piece of the anode and connected with an ammeter.

In the event that an HF voltage source is used, the current transformer component advantageous is surrounded by HF shielding.

Compared to known sources, the inventive glow discharge source is distinguished by the fact that the current measurement is integrated in the source, since the current, flowing in the region of the anode, which is grounded at the generator, is converted into a measurement signal. By these means, only the current, supplied to the glow discharge or the plasma, is measured and conditions, reproducible for different samples of material, are ensured. With that, the quality of the spectrometric results is improved significantly.

The invention is explained in greater detail below by means of examples and the associated drawings.

DESCRIPTION OF THE PREFERRED EMBODIMENTS

Figure 1:
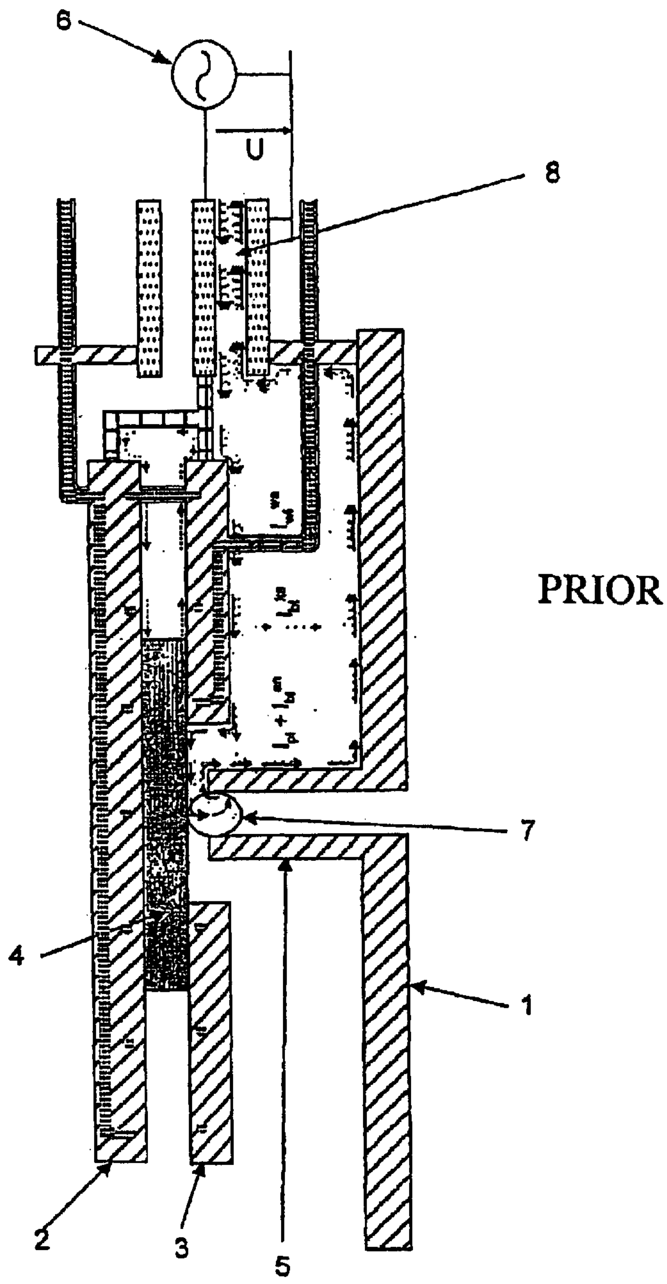
FIG. 1: shows the functional diagram of a conventional glow discharge source, operated with HF, in a sectional representation.

The conventional glow discharge source for the GD-OES, shown in FIG. 1, is constructed one anode 1 and two cathode plates 2; 3, a sample of material 4 being clamped between the cathode plates 2; 3. The cathode plates 2; 3 are equipped with cooling channels, through which water flows as coolant. The anode 1 has an anode-connecting piece 5, which discharges over the sample of material 4, forming a space.

An HF voltage source 6 is connected to the anode 1 and the cathode plates 2, 3. By these means, a glow discharge 7, with which the surface of the sample of material 4 is removed by sputtering, is maintained between the material sample 4 and the end of the anode-connecting piece 5. The glow discharge 7, into which the chemical elements, sputtered from the material sample 4, are brought, is then analyzed by means of OES.

For this glow discharge source, the current is measured in a known manner in the connecting lead 8 by means of a current transformer. This measurement is associated with the already indicated distortion of the measured value by the idle current $T_{bl}$, which is also measured and by the current $T_{wi}^{wa}$ leaking away over the cooling water.

EXAMPLE 1

Figure 2:
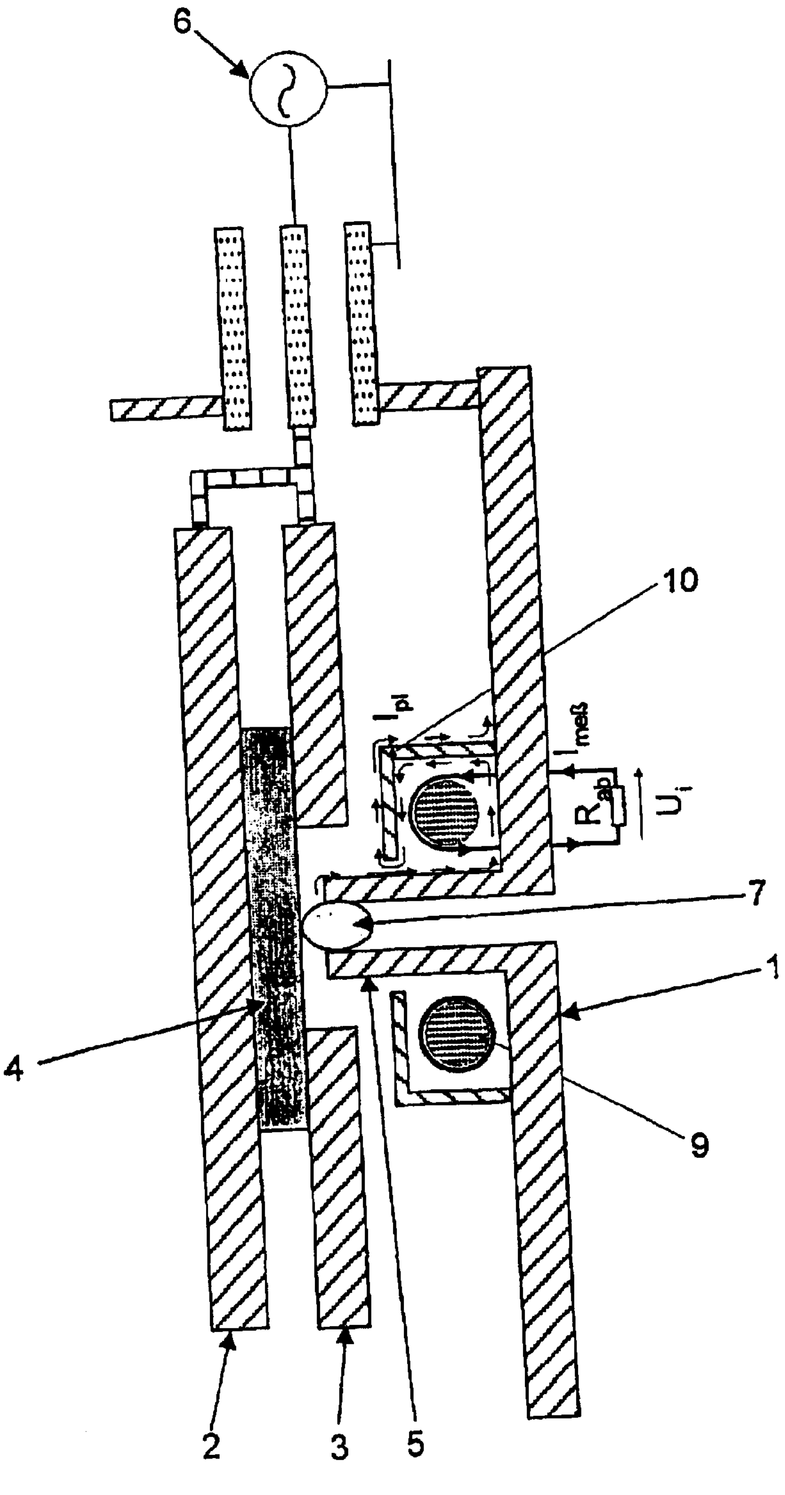
FIG. 2: shows an inventive glow discharge source, operated with HF, in sectional representation with an integrated induction coil.
Figure 3:
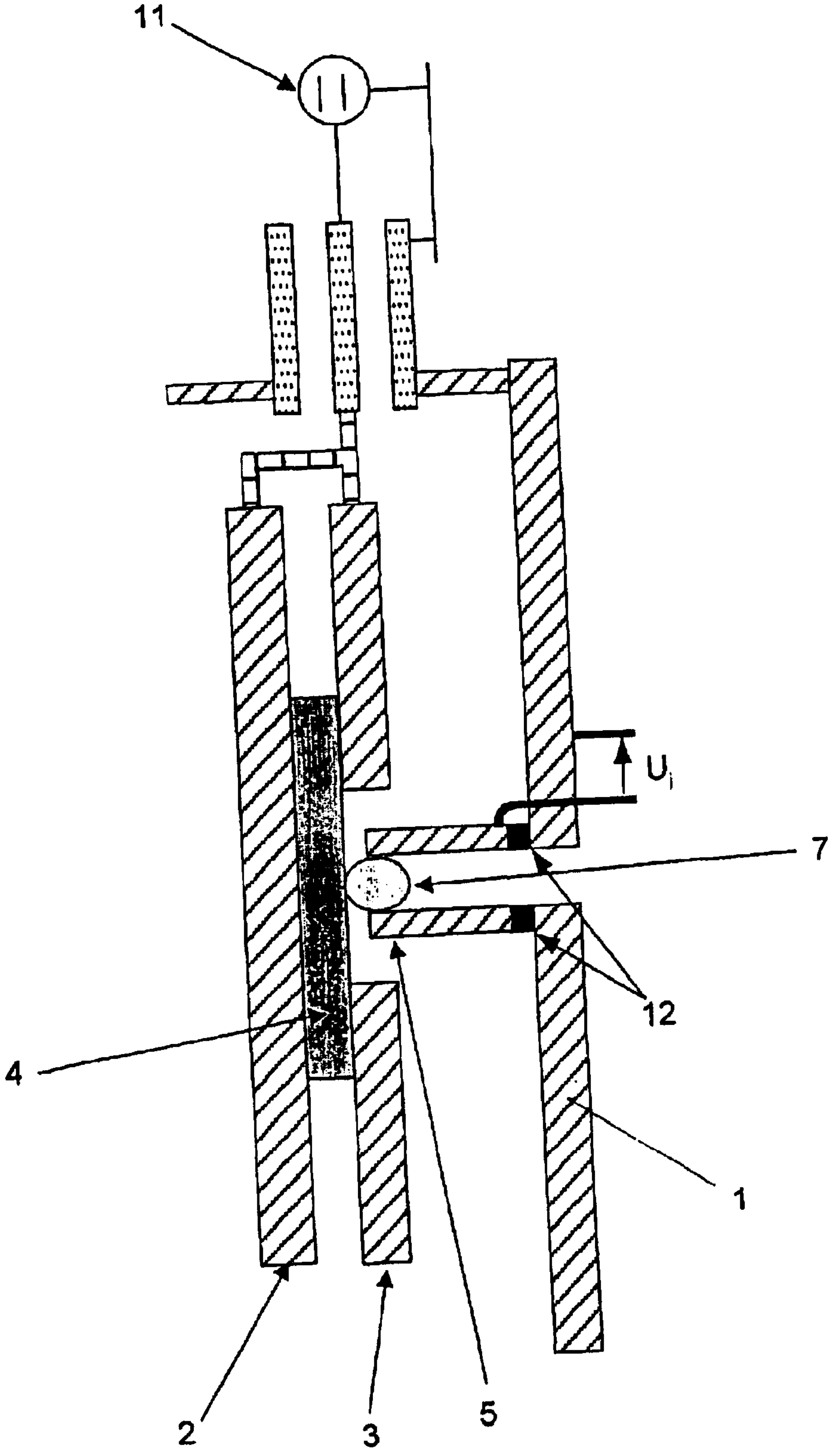
FIG. 3: shows an inventive glow discharge source, operated with direct current, in sectional representation with an integrated ohmic resistance.

A first example of glow discharge source fo the present invention, shown in FIG. 2, differs from the conventional source because an induction coil 9 is disposed around the anode-connecting piece 5. The induction coil 9 is surrounded by a HF shield 10. As endeavored, only the HF current, flowing from the glow discharge at the surface of the anode connecting piece 5 to the voltage source 6, is detected inductively with the induction coil 9.

EXAMPLE 2

In this example, which relates to an inventive glow discharge source supplied by a direct current source 11, an ohmic resistance 12 is inserted in the anode connecting piece 5. This resistance 12 is connected with an ammeter. With this glow discharge source also, only the current, flowing from the glow discharge to the voltage source, is detected.

What is claim is:

1. A glow discharge source for the elemental analysis of a solid sample of material by means of optical glow discharge spectroscopy (GD-OES) or glow discharge mass spectroscopy (GD-MS) or secondary neutral particle mass spectroscopy (SNMS), comprising:

an electrical voltage source;

a cathode supporting said solid sample and connected to said electrical voltage source;

an anode connected to said electrical voltage source and disposed adjacent said solid sample such that a plasma current from said electrical voltage source applied by said anode to said solid sample generates plasma producing the glow discharge; and a current detecting device disposed at said anode for detecting the plasma current flowing from the electrical voltage source and through the anode.

2. The glow discharge source of claim 1, wherein the current detecting device is a coil inductively coupled with said anode.

3. The glow discharge source of claim 1, wherein the current detecting device is a Hall generator.

4. The glow discharge source of claim 1, further comprising:

an anode connecting member supporting said anode and electrically connecting said anode to said electrical voltage source; and the current detecting device including an ohmic resistance inserted between the anode connecting member and said anode and an ammeter connected across said ohmic resistance.

5. The glow discharge source of claim 1, further comprising:

said electrical voltage source being an HF voltage source, and an HF shield surrounding the current detecting device.

6. The glow discharge source of claim 5, wherein the current detecting device is a coil inductively coupled with said anode.

7. The glow discharge source of claim 4, wherein said electrical source.

* * * * *